Oct. 12, 1926.

B. F. AUGUSTINE 1,602,960

CRANK SHAFT CONNECTION AND MEANS FOR LUBRICATING SAME

Original Filed March 8, 1918    3 Sheets-Sheet 1

Inventor
BENJAMIN FRANKLIN AUGUSTINE.

By
Sturtevant + Mason Attorneys

Oct. 12, 1926. 1,602,960
B. F. AUGUSTINE
CRANK SHAFT CONNECTION AND MEANS FOR LUBRICATING SAME
Original Filed March 8, 1918 3 Sheets-Sheet 2

Inventor
BENJAMIN FRANKLIN AUGUSTINE.

By
Sturtevant & Mason Attorneys

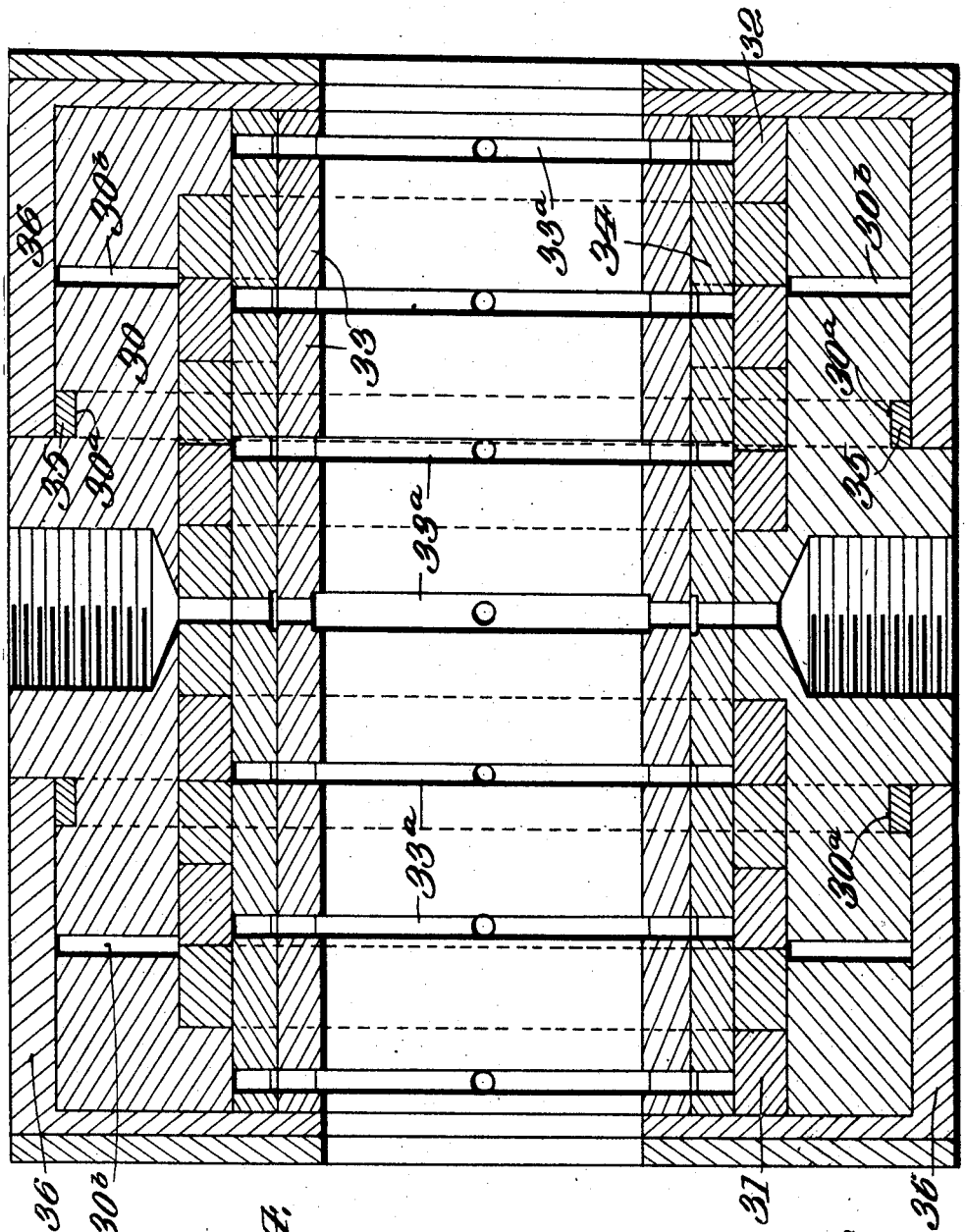

Patented Oct. 12, 1926.

1,602,960

UNITED STATES PATENT OFFICE.

BENJAMIN FRANKLIN AUGUSTINE, OF BUFFALO, NEW YORK, ASSIGNOR TO AUGUSTINE AUTOMATIC ROTARY ENGINE COMPANY, OF BUFFALO, NEW YORK, A CORPORATION OF NEW YORK.

CRANK-SHAFT CONNECTION AND MEANS FOR LUBRICATING SAME.

Original application filed March 8, 1918, Serial No. 221,256. Divided and this application filed July 1, 1922. Serial No. 572,126.

This invention relates to new and useful improvements in gas engines, and more particularly to certain improvements in two-cycle engines of the rotating cylinder type.

The details of construction which form the subject-matter of this invention are fully shown and described, but not claimed, in my Patent No. 1,442,596, filed March 8, 1918, of which this present application is a division.

One of the objects of the present invention resides in the novel construction of the connection between the plurality of piston rods and the central crank whereby the driving torque is evenly distributed and excessive wear on the parts is eliminated.

Still another feature of this invention resides in the improved manner of constructing the connecting means between the rods and central crank to facilitate assembly of these parts.

Yet another phase of the invention relates to the novel manner of lubricating these connections so that the various wearing surfaces are constantly provided with a sufficient supply of lubricant.

These and other objects will in part be obvious and will in part be hereinafter more fully disclosed.

Referring now more particularly to the drawings:—

Fig. 2 is an end view of the crank connection showing the oiling features in dotted lines, the end cups being removed;

Fig. 3 is a perspective view of two of the crank elements showing how these parts are nested together, and Fig. 4 is a sectional view longitudinally of the crank connection between the connecting rods and the fixed crank.

Figure 1:
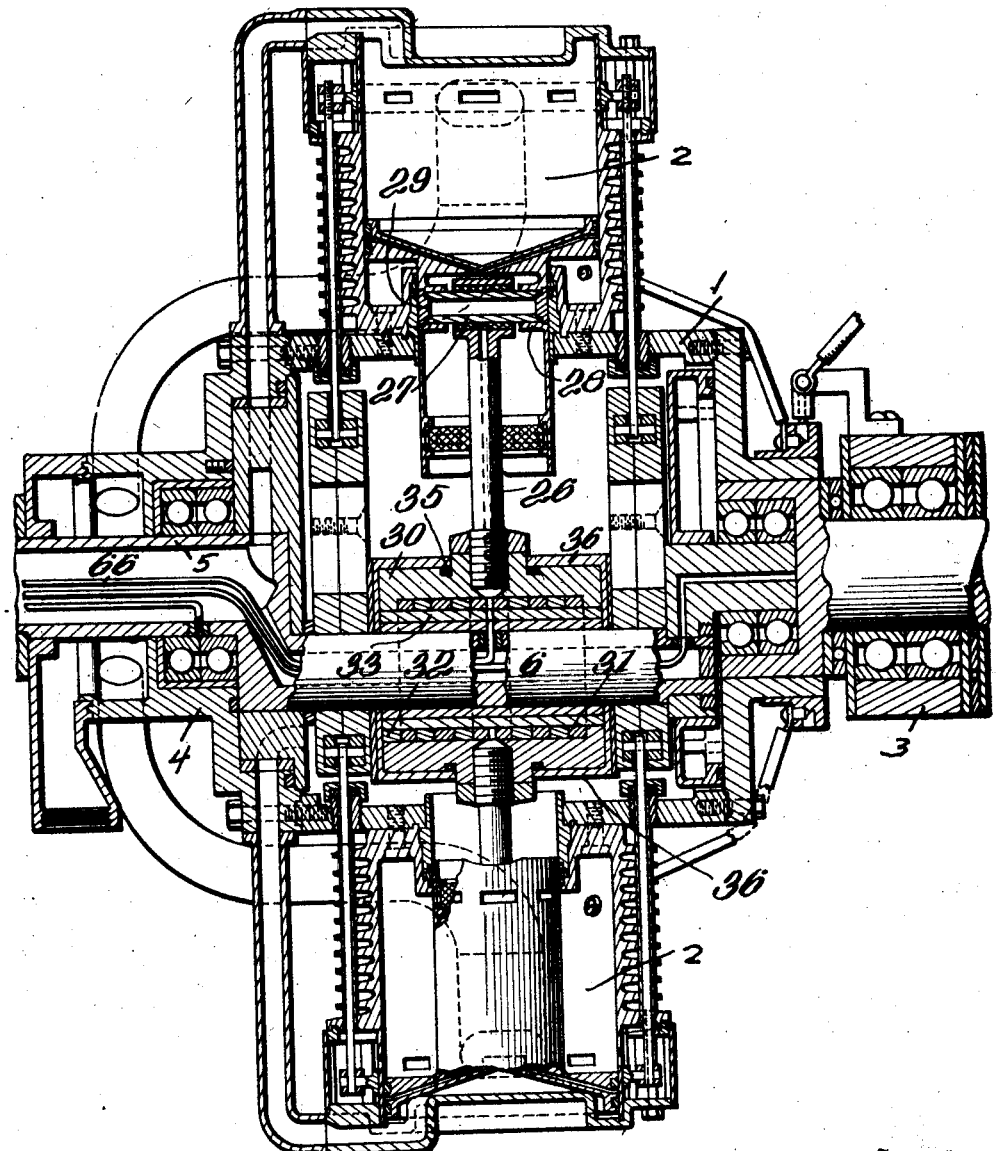
Figure 1 is a sectional view of the complete engine.

Referring now more particularly to the accompanying drawings, only such parts of the engine will be described as are peculiarly relevant to the invention claimed, the remaining part of the structure being fully covered in my prior application heretofore referred to.

The gas engine comprises a casing 1 mounting the radially disposed cylinders 2. The crank casing rotates in the journal bearings carried on supporting frames 3 and 4. Fixed to frame section 4 is shaft 5 formed with a crank 6 offset from the axis of the shaft. In the present structure, each piston is connected to the central crank 6 by a connecting rod 26. Each of these connecting rods 26 is attached to a wrist pin 27 mounted in inwardly projecting bearings 28 carried by each piston and held in place by cap plates 29. The inner end of each connecting rod is attached to crank 6 by an improved connection comprising a plurality of cross bars 30 each of which has formed integral therewith spaced rings 31 and 32. These rings are attached to their respective cross bars so that they may be nested together as clearly shown in Figures 2 to 4. Inside of the nested rings are arranged two floating sleeves 33 and 34 which are constructed and arranged to take a portion of the pull exerted by the connecting rods on the crank 6. Each cross bar 30 at opposite sides of its connecting rod 26 is provided with a groove 30ª in its outer face and compression rings 35 are slipped over the ends of the cross bars after the parts are assembled and snap into these grooves, after which cups 36 are then slipped over the ends of the cross bars and over the compression rings, which thus engage their respective cups and form oil pockets for retaining the lubricating oil within the cups. By means of this construction, the pull on the connecting rods 26 causes the cross rods or bars carried thereby to engage the cups thereby drawing the same against the opposed cross bars, thereby distributing the load and preventing undue wear on all parts.

An extremely simple and efficient means for lubricating this connection between the crank and piston rods is obtained by extending lubricating pipes through the hollow crank shaft 5. One of these oil conduits such as 66 is arranged to furnish oil to the crank shaft, by means of its continuation to the interior of the piston as clearly shown in Fig. 1. In such an arrangement, the oil passes out through the groove and openings 33ᵃ in the floating sleeves 33 and 34 and also through openings 30ᵇ in the cross bars 30 and rings 31 and 32 thereby effectively lubricating all of these parts.

It is obvious from the foregoing that a connection such as described is of very simple construction, is exceedingly easy to assemble, and when assembled, most effectively distributes the stresses and torques due to the reaction of the plurality of piston rods on the crank shaft. It is also evident that by means of the simple lubricating system, the oil is continuously passed to all inner wearing surfaces of this connection so as to provide a constant and fresh supply of lubricating oil.

It is obvious that minor changes in the details of construction and arrangement of the parts may be made without departing from the spirit of the invention as set forth in the appended claims.

Having thus described the invention, what I claim as new and desire to secure by Letters-Patent, is—

1. A gas engine including in combination a rotatable casing, a plurality of radially disposed cylinders connected thereto, a fixed shaft having a crank located in said casing, said casing rotating about said fixed shaft as an axis, a piston in each cylinder, a connecting rod for joining each piston to the crank, each connecting rod having a cross bar and symmetrically disposed rings one on each side of the connecting rod, the rings on the several cross bars being disposed so that they may be nested, floating sleeves located one within the other and between the nested rings and the crank, said floating sleeves, rings and crossbars having openings and grooves for lubricating the parts, said shaft having a hollow chamber and an oil pipe extending through said hollow chamber to the crank, whereby lubricating oil may be delivered to said parts, end cups inclosing the ends of the cross bars on each side of the connecting rods, each cross bar at each side of the connecting rod having a groove formed therein and a compression ring adapted to engage said groove and the inner face of the respective cups for holding the lubricating oil within the cups.

2. A gas engine including in combination, a rotating casing, a plurality of radially disposed cylinders connected thereto, a fixed shaft having a crank located in said casing, said casing rotating about said fixed shaft as an axis, a piston in each cylinder, a connecting rod for joining each piston to the crank, each connecting rod having a cross bar and symmetrically disposed rings one on each side of the connecting rod, the rings on the several cross bars being disposed so that they may be nested, floating devices located one within the other and between the nested rings and the crank, said floating devices, rings and cross bars having openings and grooves for lubricating the parts, said shaft having a hollow chamber and an oil pipe extending through said hollow chamber to the crank, whereby lubricating oil may be delivered to said parts, end cups inclosing the ends of the cross bars on each side of the connecting rods, each cross bar at each side of the connecting rod having a groove formed therein, and a compression ring adapted to engage said groove and the inner face of the respective cups for holding the lubricating oil within the cups.

3. A gas engine including in combination a rotatable casing, a plurality of radially disposed cylinders connected thereto, a fixed shaft having a crank located in said casing, said casing rotating about said fixed shaft as an axis, a piston in each cylinder, a connecting rod for joining each piston to the crank, each connecting rod having a cross bar and symmetrically disposed rings one on each side of the connecting rod, the rings on the several cross bars being disposed so that they may be nested, floating sleeves located one within the other and between the nested rings and the crank, said floating sleeves, rings and cross bars having openings and grooves for lubricating the parts, said shaft having a hollow chamber and an oil pipe extending through said hollow chamber to the crank, whereby lubricating oil may be delivered to said parts, end cups inclosing the ends of the cross bars on each side of the connecting rods, each connecting rod having a passage extending lengthwise thereof for conveying the oil outwardly to the connection between the connecting rod and the piston.

4. A gas engine including in combination, a rotatable casing, a plurality of radially disposed cylinders connected thereto, a fixed shaft having a crank located in said casing, said casing rotating about said fixed shaft as an axis, a piston in each cylinder, a connecting rod for joining each piston to the crank, each connecting rod having a cross bar and symmetrically disposed rings one on each side of the connecting rod, the rings on the several cross bars being disposed so that they may be nested, floating sleeves located one within the other and between the nested rings and the crank, said floating sleeves, rings and cross bars having openings and grooves for lubricating the parts, said shaft having a hollow chamber and an oil pipe extending through said hollow chamber to the crank, whereby lubricating oil may be delivered to said parts, end cups inclosing the ends of the cross bars on each side of the connecting rods, each connecting rod having a passage extending lengthwise thereof for conveying the oil outwardly to the connection between the connecting rod and the piston, each cross bar at each side of the connecting rod having a groove formed therein and a compression ring adapted to engage said groove and the inner face of the respective cups for holding the lubricating oil within the cups.

In testimony whereof, I affix my signature.

BENJAMIN FRANKLIN AUGUSTINE.